US 6,552,459 B2

(12) United States Patent
Burton

(10) Patent No.: US 6,552,459 B2
(45) Date of Patent: Apr. 22, 2003

(54) PERMANENT MAGNET ROTOR DESIGN

(75) Inventor: Stephen J. Burton, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/813,173

(22) Filed: Mar. 20, 2001

(65) Prior Publication Data
US 2002/0135252 A1 Sep. 26, 2002

(51) Int. Cl.[7] .............................................. H02K 21/12
(52) U.S. Cl. ........................ 310/156.08; 310/156.12; 310/156.21
(58) Field of Search ............................ 310/91, 42, 261, 310/156.08, 156.12, 156.13, 156.19, 156.21, 156.22, 156.38, 154.03, 154.07, 154.08, 154.17, 154.18, 154.19; 29/596–598

(56) References Cited

U.S. PATENT DOCUMENTS

| 4,542,313 A | * | 9/1985 | Pietro .......................... 310/216 |
| 4,954,736 A | * | 9/1990 | Kawamoto et al. .......... 310/156 |
| 5,038,065 A | * | 8/1991 | Matsubayashi et al. ..... 310/156 |
| 5,175,461 A | * | 12/1992 | Zigler et al. ................. 310/156 |
| 5,345,129 A | * | 9/1994 | Molnar ........................ 310/156 |
| 5,397,951 A | * | 3/1995 | Uchida et al. ............... 310/156 |
| 6,025,665 A | | 2/2000 | Poag et al. .................... 310/91 |
| 6,078,121 A | | 6/2000 | Poag et al. .................... 310/89 |
| 6,225,724 B1 | * | 5/2001 | Toide et al. ................. 310/216 |

FOREIGN PATENT DOCUMENTS

| EP | 0909003 A | 4/1999 |
| JP | 01077450 A | 3/1989 |
| JP | 03150030 A | 6/1991 |
| JP | 07107687 A | 4/1995 |
| JP | 11089141 A | 3/1999 |
| JP | 2000156956 A | 6/2000 |

* cited by examiner

Primary Examiner—Tran Nguyen
(74) Attorney, Agent, or Firm—Thompson Coburn LLP

(57) ABSTRACT

A rotor assembly is comprised of a rotor core and at least one magnet. The rotor core has a support protrusion projecting radially outwardly from the core exterior surface. The at least one magnet is positioned on the support protrusion and is supported in a radially outward spaced relation from the core exterior surface. The radially outward spacing defines a radial spacing between the core exterior surface and the at least one magnet. A connection is located in the radial spacing and holds the at least one magnet to the core exterior surface. A method of assembling the rotor core assembly comprises the steps of providing the rotor core with a support protrusion projecting radially outwardly from the core exterior surface. Providing at least one magnet. Positioning the at least one magnet on the support protrusion so that the at least one magnet is supported in a radially outward spaced relation from the core exterior surface and defines a radial spacing between the at least one magnet and the core exterior surface, and providing a connection in the radial spacing that holds the at least one magnet to the core exterior surface.

25 Claims, 2 Drawing Sheets

PERMANENT MAGNET ROTOR DESIGN

BACKGROUND OF THE INVENTION (i) Field of the Invention

The present invention relates in general to rotor assemblies for use in rotating machines, and more specifically to an improvement in the attaching of magnets to the rotor core of a rotor assembly.

(ii) Description of the Related Art

Machines powered by electric motors often use motors having permanent magnet rotor assemblies. The typical rotor assembly of this type has a plurality of permanent magnets spaced around the periphery of a rotor core. The rotor core has a cylindrical exterior surface and the magnets have arcuate shapes with concave interior surfaces and convex exterior surfaces. The magnets are held in place relative to the rotor core by adhesives between the magnet interior surfaces and the rotor core exterior surface.

In the process of attaching the magnets to the rotor core with adhesives, the thickness and uniformity of the adhesive layer greatly determines the shear strength of the adhesive. It is desirable to control the thickness and uniformity of the adhesive layer to ensure adequate adhesion. It is also desirable when attaching the magnets to the rotor core to have the magnets maintain their shape and to not deform, as will be discussed in more detail below.

When attaching the permanent magnets to the rotor core with adhesives, the magnets usually have a relief or recess ground into the interior surface of the magnet to provide a recess within the surface for the adhesive. The adhesive is then applied to the recess in the magnet interior surfaces and the magnets are positioned on the exterior surface of the rotor core. A clamp or other retaining means is then tightly secured around the magnet exterior surfaces to hold the magnets in place on the rotor core until the adhesive has cured.

The use of a clamp has drawbacks. When the magnets are clamped to the rotor core, excessive tightening of the clamp, variation in rotor size, and variation in magnet thickness can all cause the clamp to deform the magnets and compress the gaps formed between the recesses in the interior surfaces of the magnets and the exterior surface of the rotor core expelling some of the adhesive from the gaps. The compression of the gaps can change the thickness of the adhesive layers to less then the required thickness. The reduced thickness of the layer of adhesive can cause premature failure of the adhesive. Additionally, when the clamp is removed (after the adhesive layer has cured), the magnets will decompress and attempt to return to their normal/relaxed (non-compressed) states. The gaps will also try to return to their original dimensions and the adhesive layer will resist the gaps returning to their original dimensions. As a result, the magnets will exert a tensile force on the adhesive layer and thus form a weakened bond between the magnets and the rotor core. The tensile force on the adhesive layer and the weakened bond can result in magnets coming loose from the rotor and the failure of the motor.

Furthermore, the need to have a relief ground in the magnets adds to the cost to manufacture the rotor assembly.

SUMMARY OF THE INVENTION

The present invention overcomes the shortcomings of prior art rotor assemblies by providing a rotor assembly that uses a clamp and an adhesive layer to attach the magnets to the rotor core while minimizing the potential variability in the thickness of the adhesive layer and the tension on the adhesive layer caused by excessive tightening of the clamp, variation in rotor size, and/or variation in magnet thickness.

The improved rotor design does not require the use of recesses in the interior surfaces of the magnets for the adhesive. Rather, the improved rotor design uses one or more radial protrusion(s) on the cylindrical exterior surface of the rotor core to form a recess on the rotor core for the adhesive. Magnets are positioned around the periphery of the rotor core on the radial protrusion(s) which prevent the interior surfaces of the magnets from contacting the rotor core exterior surface and support the interior surfaces of the magnets in a radially outward spaced relation from the rotor core exterior surface. The protrusion(s) thereby form a radial spacing between the interior surfaces of the magnets and the rotor core exterior surface. The adhesive is positioned in the radial spacing formed by the protrusion(s) instead of in a recess in the interior surfaces of the magnets as is done in the prior art. The radial protrusion(s) support the interior surface of the magnets and minimize and/or prevent the magnets from deforming radially inward when being held in place by a clamp or other retaining means while the adhesive cures. The protrusion(s) also help maintain a uniform radial spacing between the interior surface of the magnet and the rotor core exterior surface so that the layer of adhesive is uniform and of the required thickness.

The protrusion(s) can be of a variety of sizes and shapes that will maintain the magnets in a radially spaced relation from the core exterior surface. For example, the protrusion(s) can be bumps, ribs, spikes, or the like and can be pointed, rounded, squared, etc. The protrusion(s) can also extend along the exterior surface of the rotor core. For example, the protrusion(s) can extend along the core exterior surface circumferentially, axially, diagonally, etc. Additionally, the protrusion(s) can be spaced around the rotor core exterior surface in a variety of arrangements, such as equally circumferentially spaced positions of the protrusions around the rotor core exterior surface. However, it is preferred that the protrusion(s) be spaced around the rotor core so as to facilitate the manufacturing of the rotor cores, the assembly of the rotor assemblies, and the support of the magnets.

Each protrusion can be arranged on the rotor core exterior surface to be in contact with only a single portion of a magnet, such as a mid portion of the magnet, or arranged to be in contact with multiple portions of the magnet, such as opposite end portions and a mid portion of the magnet. Additionally, each protrusion can be in contact with and support multiple magnets and more than one protrusion can be in contact with and support the same magnet. A variety of configurations and arrangements of the protrusion(s) on the exterior surface of the rotor core that radially space the interior surface of the magnets from the exterior surface of the rotor core may be employed.

The use of the protrusion(s) allows use of a clamp or other retaining means to hold the magnets around the rotor core while the adhesive cures without excessive tightening of the clamp, variation in the rotor size, or variation in magnet thickness causing the clamp to deform the magnets, expel some adhesive from the radial spacing and/or cause a tensile force to be exerted on the adhesive layer when the clamp is removed (after the adhesive has cured). The improved rotor design thereby prolongs the life of the rotor assembly and overcomes the disadvantages and limitations of the prior art.

In another aspect of the invention, there are two rotor cores. The two rotor cores are similar and are axially stacked end to end to form a larger rotor assembly. The two rotor cores of the larger rotor assembly are held axially together by being press fit on a rotor shaft. The rotor cores each have axially opposite first and second ends. The first ends each have one or more projections extending axially outwardly from the first ends and the second ends each have one or more notches extending axially inwardly from the second ends. The notches and projections are complementary so that the projection(s) on the first end of one rotor core engage in the notch(es) on the second end of the other rotor core when the two rotor cores are axially stacked. The engagement of the projection(s) in the notch(es) axially and circumferentially aligns the two rotor cores. The protrusion(s) on the exterior surfaces of both rotor cores are arranged to be aligned when the two rotor cores are axially stacked so as to provide the same support on each of the rotor cores for the magnets positioned around the periphery of the two rotor cores.

In still another aspect of the invention, a method of assembling a rotor assembly is provided. The method comprises the steps of providing a rotor core such as that described above. Providing one or more magnets and positioning the magnet(s) on the protrusion(s) of the rotor core so that the magnet(s) are supported in a radially outward spaced relation from the core exterior surface by the protrusion(s). The radially outward spaced relation thereby defines a radial spacing between the rotor core exterior surface and the interior surface of the magnet(s). A connection is provided in the radial spacing that holds the magnet(s) to the core exterior surface. The connection is provided by applying an adhesive in the radial spacing that holds the magnet(s) to the rotor core exterior surface. The method also comprises placing a clamp around the magnet(s) and the rotor core to hold the magnet(s) in place on the protrusion(s) while the adhesive is curing. The adhesive is allowed to cure and then the clamp is removed, producing the improved rotor assembly.

These different aspects of the invention overcome the drawbacks of the prior art. The use of a protrusion(s) to support the magnet(s) in a spaced relation from the core exterior surface(s) prevents or at a minimum helps to minimize the deformation of the magnet(s) when being held around the rotor core(s) by a clamp or other retaining means. The minimal deformation or absence thereof minimizes or prevents a tensile force from being exerted on the connection holding the magnet(s) to the core exterior surface(s) when the clamp or other retaining means are removed. Additionally, the protrusion(s) provide a generally uniform radial spacing between the magnet(s) and the core exterior surface(s) and thereby aids in achieving the desired uniform thickness of adhesive holding the magnet(s) to the core exterior surface(s).

BRIEF DESCRIPTION OF DRAWINGS

Further aspects and features of the present invention are set forth in the following detailed description of the preferred embodiment of the invention and in the drawing figures wherein.

DETAILED DESCRIPTION OF THE INVENTION

Figures 1, 2, 3:
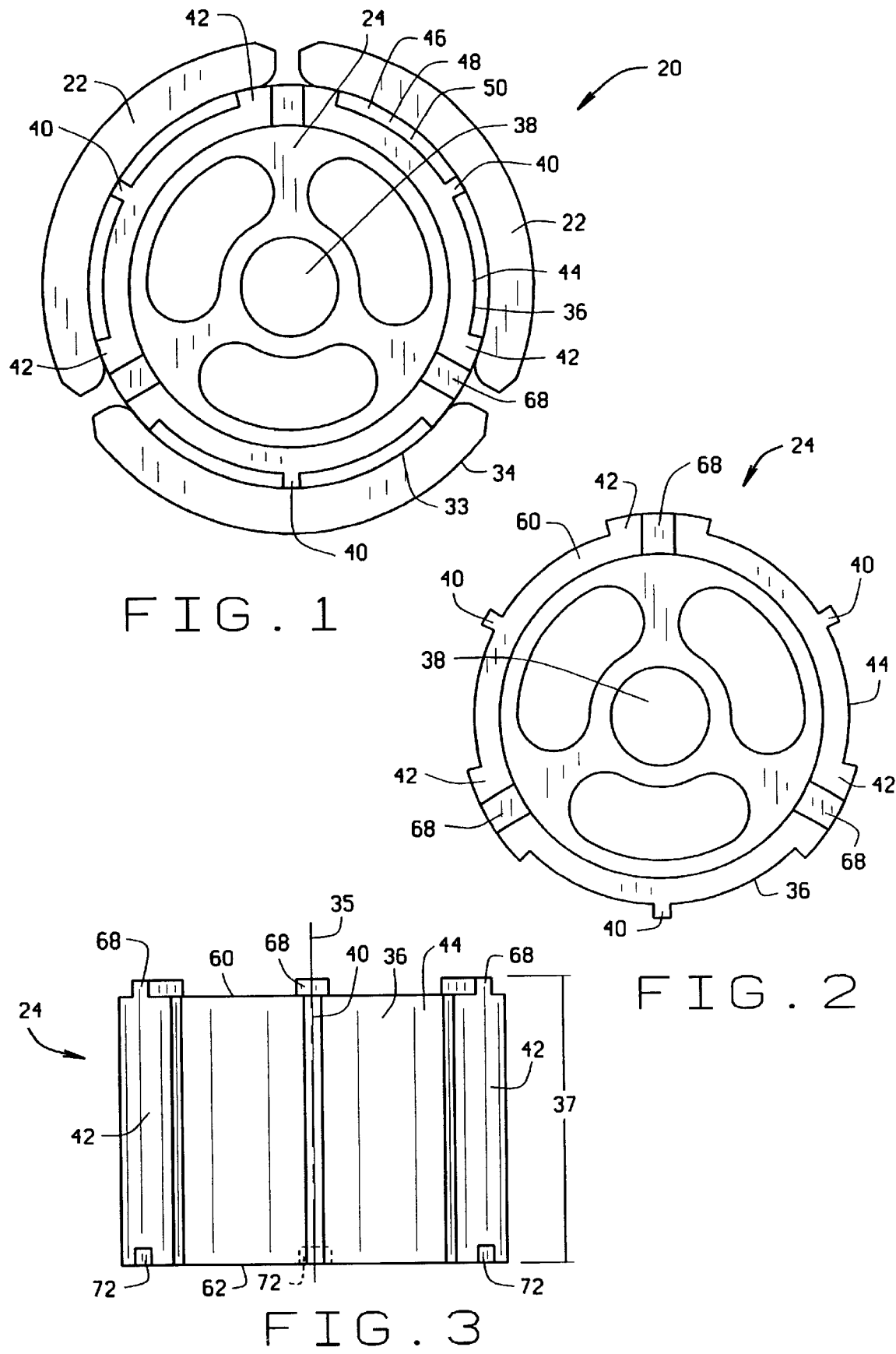
FIG. 1 is a top plan view of the rotor assembly.
FIG. 2 is top plan view of the rotor core of FIG. 1.
FIG. 3 is an elevation view of the rotor core of FIG. 2.

It is to be understood that the dimensions of some features of the invention that appear in the drawing figures are enlarged or exaggerated to show detail and that specific dimensions or relative dimensions appearing in the drawing figures are not to be used in determining the scope of the invention as defined by the claims.

FIG. 1 shows the rotor assembly of the present invention that is generally indicated as 20. The rotor assembly 20 is comprised of magnets 22 spaced around a rotor core 24. Preferably, the rotor assembly 20 has three permanent magnets 22 spaced around the rotor core 24. However, it should be understood that other types and other numbers of magnets 22 could be employed without departing from the scope of the invention as defined by the claims.

Figure 4:
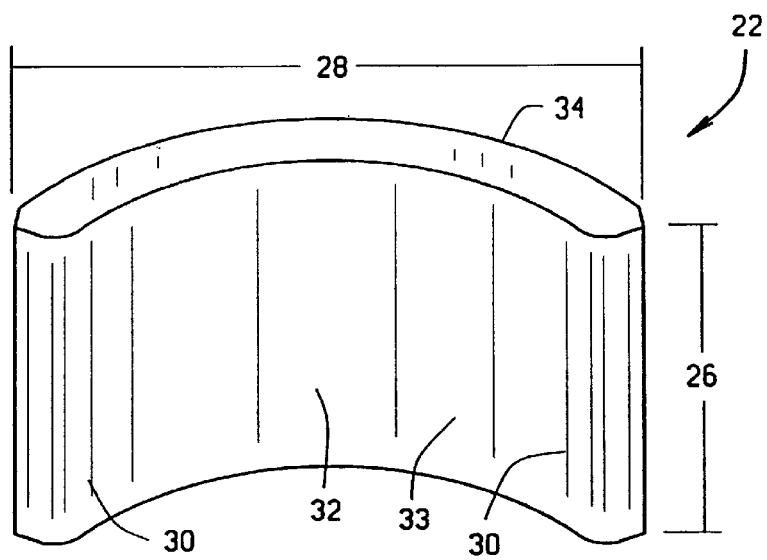
FIG. 4 is a perspective view of a magnet of the rotor assembly of FIG. 1.

As can best be seen in FIG. 4, the magnet 22 has an axial length 26 and a transverse width 28. The width of the magnet 22 has opposite end portions 30 and a mid portion 32 therebetween. It is preferred that the magnet 22 have a curvature that is complementary to the rotor core 24, however, the magnet 22 does not need to be curved to practice the invention. The curvature of the magnet gives it a concave interior surface 33 and a convex exterior surface 34.

The rotor core 24, as best seen in FIGS. 2 and 3, has a center axis of rotation 35 and a cylindrical exterior surface 36 with an axial length 37. It is preferred that the axial length 26 of the magnet 22 be larger than the axial length 37 of the rotor core 24. The rotor core 24 also has a center opening 38 configured and adapted to be press fit on a rotor shaft 39. The exterior surface 36 has protrusions projecting radially outwardly from the exterior surface 36. The protrusions include primary protrusions 40 and secondary protrusions 42 that are positioned on the core to support different portions of the magnets, as will be explained. There is at least one primary protrusion 40 for each magnet 22. The primary protrusions 40 are circumferentially spaced around the rotor core 24. In the preferred embodiment, the primary protrusions 40 are formed as ribs that extend axially over the core exterior surface 36 between the axially opposite ends of the core. However, it should be understood that any number of primary protrusions 40 can be employed and the primary protrusions 40 can extend in a variety of patterns across the core exterior surface 36. It should also be understood that while all of the protrusion(s) are shown as being ribs, the protrusion(s) can have a variety of different lengths or widths and can have different shapes, such as bumps or the like, without departing from the scope of the invention as defined by the claims.

The primary protrusions 40 serve to space the magnets 22 from the core exterior surface 36. The primary protrusions 40 also serve to prevent or at least minimize the deflection of the magnets 22 when a clamp (not shown) or other retaining means are employed to temporarily hold the magnets 22 on the rotor core 24 as will be discussed in more detail below.

As stated earlier, the rotor core 24 also has a plurality of secondary protrusions 42. The secondary protrusions 42 project radially outwardly from the exterior surface 36 and extend along the exterior surface 36. The secondary protrusions 42, like the primary protrusions 40, serve to space the magnets 22 in a radially outward spaced relation from the exterior surface 36. It is preferred that the secondary protrusions 42 extend axially along the exterior surface 36. It is also preferred that the secondary protrusions 42 be equally circumferentially spaced around the exterior surface 36 and that they be circumferentially wider than the primary protrusions 40. However, it should be understood that the secondary protrusions 42 can extend in a variety of orientations along the exterior surface 36 and be spaced around the exterior surface 36 in a variety of configurations without departing from the scope of the invention as defined by the claims.

The secondary protrusions 42 form recesses 44 on the exterior surface 36 between adjacent secondary protrusions 42. The primary protrusions 40 are positioned within the recesses 44 formed between adjacent secondary protrusions 42 and are preferably positioned in the middle of the recesses 44.

In constructing the rotor core 24, the core may be cast with a cylindrical exterior surface 36 and with the primary protrusions 40 and secondary protrusions 42 projecting outwardly from the exterior surface. However, it is preferred that the core exterior surface 36 and the primary protrusions 40 and secondary protrusions 42 be formed by machining the rotor core 24.

Preferably, the magnets 22 are circumferentially equally positioned around the rotor core 24. The magnets 22 are positioned with the end portions 30 of the magnets 22 being supported by the secondary protrusions 42 and the mid portions 32 of the magnets 22 being supported by the primary protrusions 40 with the secondary protrusions 42 and the primary protrusions 40 spacing the magnets 22 in a radially outward spaced relation from the exterior surface 36. The radially outward spacing of the magnets 22 from the exterior surface 36, as best seen in FIG. 1, defines radial spacings 46 between the magnet interior surfaces 33 and the core exterior surface 36. Connections 48 are provided in the radial spacings 46 that hold the magnets 22 to the exterior surface 36. Preferably, the connections 48 are provided by an adhesive 50 in the radial spacings 46 such as an anaerobic urethane acrylate adhesive.

The magnets 22 are held against the rotor core 24 by a clamp (not shown) while the adhesive 50 cures, however, other restraining means can be employed without departing from the scope of the invention as defined by the claims. The primary protrusions 40 and the secondary protrusions 42 prevent or at least minimize any radially inward deformation of the magnets 22 and the resulting encroachment of the magnets 22 on the radial spacings 46 when the magnets 22 are held against the rotor core 24 while the adhesive 50 cures. The primary protrusions 40 and secondary protrusions 42 thereby minimize the possibility of the adhesive 50 being squeezed out of the radial spacings 46 resulting in an adhesive layer of less than the required thickness to sufficiently hold the magnets 22 on the rotor core 24. The primary protrusions 40 and the secondary protrusions 42 also prevent or at least minimize the possibility of the magnets 22 decompressing and returning to an original/relaxed state and applying a tensile force on the adhesive 50 when the clamp or other retaining means is removed.

The secondary protrusions 42 are preferably dimensioned so that a single secondary protrusion 42 can support an end portion 30 of two adjacent magnets 22. The number of secondary protrusions 42 required is then equal to the number of magnets 22 positioned around the rotor core 24. For example, as shown in FIG. 1, when the rotor assembly 20 has three magnets 22, the core exterior surface 36 has three secondary protrusions 42 projecting radially outwardly from the exterior surface 36. However, it should be understood that other numbers of secondary protrusions 42 can be employed without departing from the scope of the invention as defined by the claims.

The method of assembling the rotor assembly 20 comprises providing a rotor core 24 with a center axis of rotation 35, a cylindrical exterior surface 36 with an axial length 37, and a primary protrusion 40 projecting radially outwardly from the core exterior surface 36 and extending along the core exterior surface 36. At least one magnet 22 is provided and is positioned on the primary protrusion 40 so that the at least one magnet 22 is supported in a radially outward spaced relation from the core exterior surface 36 by the primary protrusion 40 and thereby defines a radial spacing 46 between the core exterior surface 36 and the at least one magnet 22. A connection 48 is provided in the radial spacing 46. The connection 48 holds the at least one magnet 22 to the core exterior surface 36.

Preferably, providing the connection 48 includes applying an adhesive 50 in the radial spacing 46 that holds the at least one magnet 22 to the core exterior surface 36. Providing the connection 48 further includes placing a clamp (not shown) around the at least one magnet 22 and the rotor core 24 to hold the at least one magnet 22 in place on the primary protrusion 40 with the primary protrusion 40 preventing deformation of the at least one magnet 22 by the clamp. The adhesive 50 is then allowed to cure, and the clamp is removed after the adhesive 50 has cured.

The rotor core 24 is also provided with a plurality of secondary protrusions 42 that project radially outwardly from the core exterior surface 36 and extend along the core exterior surface 36. Positioning the at least one magnet 22 includes positioning the end portions 30 of the at least one magnet 22 on at least two of the secondary protrusions 42 so that the plurality of secondary protrusions 42 support the end portions 30 of the at least one magnet 22 in a radially outward spaced relation from the core exterior surface 36. The rotor core 24 is provided with the primary protrusion 40 positioned on the core exterior surface 36 in between two adjacent secondary protrusions 42. Positioning the at least one magnet 22 further comprises positioning the at least one magnet 22 on the primary protrusion 40 so that the mid portion 32 of the at least one magnet 22 is supported by the primary protrusion 40 in a radially outward spaced relation from the core exterior surface 36. In the preferred method the rotor core 24 is provided with a plurality of primary protrusions 40 projecting radially outwardly from the core exterior surface 36 and extending along the core exterior surface 36. Each of the plurality of primary protrusions 40 is positioned on the core exterior surface 36 between adjacent secondary protrusions 42. Positioning the at least one magnet 22 further comprises positioning the at least one magnet 22 so that the mid portion 32 of the at least one magnet 22 is supported by one of the plurality of primary protrusions 40 in a radially outward spaced relation from the core exterior surface 36.

Figure 5:
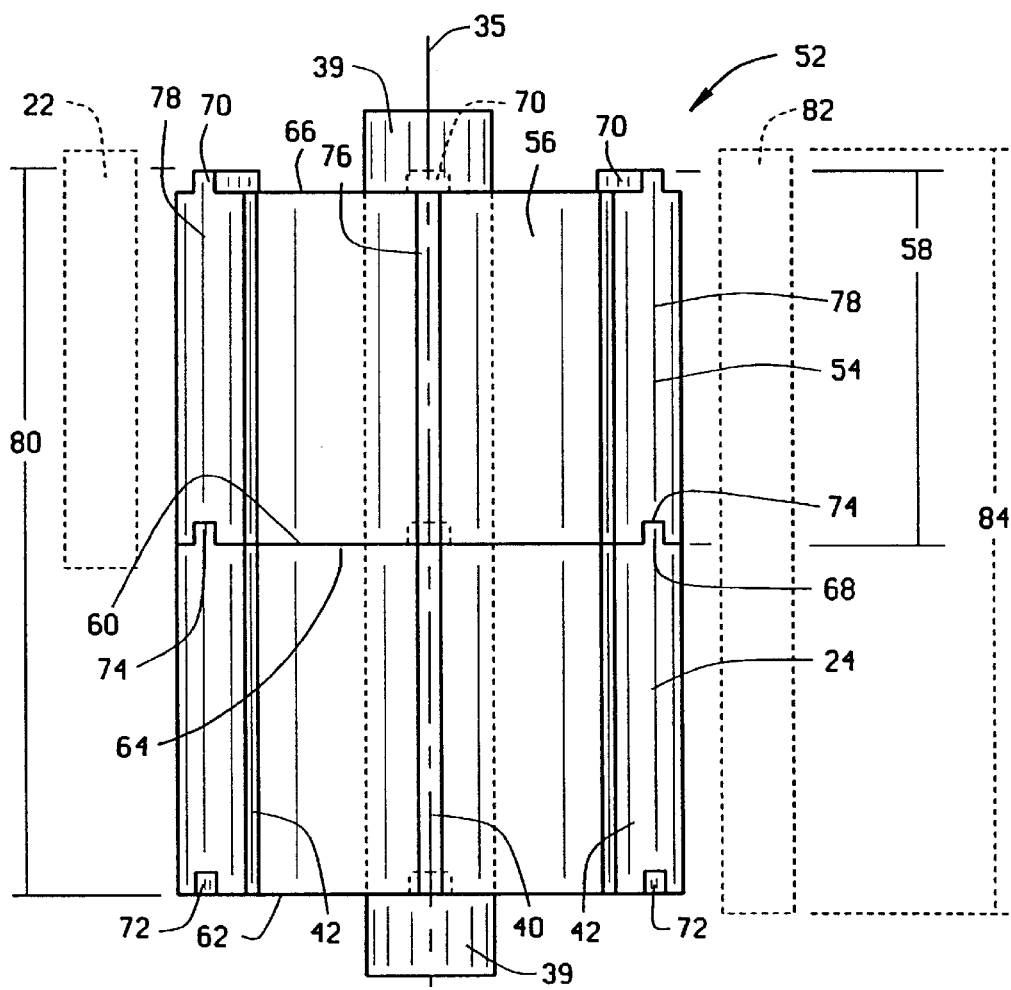
FIG. 5 is an elevation view of two rotor cores stacked together with a cross-sectional view of two different magnets showing the relationship of the two magnets to the rotor cores.

In another aspect of the invention, as shown in FIG. 5, two rotor cores are stacked axially upon one another to form a larger rotor assembly 52. In the larger rotor assembly 52 the previously described rotor core 24 is a first rotor core of a pair of first and second rotor cores mounted on the rotor shaft 39. The second rotor core 54, like the first rotor core 24, also has a center axis of rotation coaxial with the axis 35 of the first rotor core 24 and a cylindrical exterior surface 56 and an axial length 58. The axial length 58 of the second rotor core 54 is the same as the axial length 37 of the first rotor core 24. The first rotor core 24 has axially opposite first and second ends 60, 62 and the second rotor core 54 has axially opposite first and second ends 64, 66. As can best be seen in FIGS. 3 and 5, the first ends 60, 64 of the first and second rotor cores 24, 54 have respective projections 68, 70 that extend axially outwardly from the core first ends 60, 64, and the second ends 62, 66 of the first and second rotor cores 24, 54 have respective notches 72, 74 that extend axially inwardly from the core second ends 62, 66. The projections 68, 70 are complementary to the notches 72, 74 so that the projections 68 on the first end 60 of the first rotor core 24 can engage in the notches 74 on the second end 66 of the second rotor core 54 and vice versa. The engagement of the projections 68 in the notches 74 circumferentially and axially aligns the first and second rotor cores 24, 54. While the first and second rotor cores 24, 54 are shown as each having three projections 68, 70 and three notches 72, 74, it should be understood that other numbers of projections and notches can be employed.

Like the first rotor core 24, the second rotor core 54 has primary protrusions 76 that project radially outwardly from the second rotor core exterior surface 56 and extend along the second rotor core exterior surface 56. The second rotor core 54 also has secondary protrusions 78 that project radially outwardly from the second rotor core exterior surface 56 and extend axially along the second rotor core exterior surface 56. The engagement of the projections 68 of the first rotor core 24 in the notches 74 of the second rotor core 54 causes the first rotor core primary protrusions 40 and secondary protrusions 42 to be aligned with the respective second rotor core primary protrusions 76 and secondary protrusions 78.

As can be seen in FIG. 5, when the first and second rotor cores 24, 54 are stacked upon one another so that the first core projections 68 engage in the second core notches 74, the axial length 80 of the stacked first and second rotor cores 24, 54 is greater than the axial length 26 of the first described magnet 22. Therefore, a larger magnet 82 is employed with this embodiment. The larger magnet 82 is identical to the first described magnet 22 except for its axial length 84. Therefore, reference numbers for the end portions and mid portion of the larger magnet 78 will be the same as those used on the first described magnet 22 but followed by a prime ('). The axial length 84 of the larger magnet 82 is larger than the axial length 26 of the first described magnet 22 and is preferably larger than the axial length 80 of the stacked first and second rotors 24, 54. It is also preferred that in the larger rotor assembly 51, the larger magnet 82 is positioned on the first and second rotor cores 24, 54 so that the secondary protrusions 42, 78 of the first and second rotor cores 24, 54 support end portions 30' of the larger magnet 82 in a radially outward spaced relation from the exterior surfaces 36, 56 of the first and second rotor cores 24, 54.

Another aspect of the earlier described method includes assembling the larger rotor assembly 52. In this aspect, the step of providing a rotor core 24 comprises providing a first rotor core 24 with axially opposite first and second ends 60, 62 with the first rotor core first end 60 having at least one projection 68 extending axially outwardly from the first rotor core first end 60 and the first rotor core second end 62 having at least one notch 72 extending axially inwardly from the first rotor core second end 62. The at least one projection 68 is complementary to the at least one notch 72. The method further comprises providing a second rotor core 54 having a center axis of rotation, a cylindrical exterior surface 56 with an axial length 58, and axially opposite first and second ends 64, 66. The second rotor core first end 64 has at least one projection 70 extending axially outwardly from the second rotor core first end 64 and the second rotor core second end 66 has at least one notch 74 extending axially inwardly from the second rotor core second end 66. The second rotor core at least one projection 70 and at least one notch 74 being generally the same as the first rotor core at least one projection 68 and at least one notch 72. The method also comprises providing a shaft 39 and mounting the first and second rotor cores on that shaft so that the first rotor core at least one projection 68 engages in the second rotor core at least one notch 74 and aligns the first 24 and second 54 rotor cores on the shaft.

Preferably the step of providing at least one magnet further comprises providing at least one larger magnet 82 having an axial length 84 and a transverse width 28' with opposite end portions 30' therebetween. The step of providing a first rotor core 24 further comprises providing the first rotor core 24 with the plurality of secondary protrusions 42 extending axially along the first rotor core exterior surface 36. The step of providing a second rotor core 54 further comprises providing the second rotor core 54 with a primary protrusion 76 that projects radially outwardly from the second rotor core exterior surface 56 and extends along the second rotor core exterior surface 56 and with a plurality of secondary protrusions 78 that project radially outwardly from the second rotor core exterior surface 56 and extend axially along the second rotor core exterior surface 56. The step of mounting the first and second rotor cores 24, 54 on a shaft further comprises mounting the first and second rotor cores 24, 54 so that the first rotor core at least one projection 68 engages in the second rotor core at least one notch 74 and aligns the first and second rotor core primary protrusions 40, 76 and pluralities of secondary protrusions 42, 78. The step of positioning the at least one magnet 82 further comprises positioning the at least one magnet 82 on the first and second rotor core pluralities of secondary protrusions 42, 76 so that the end portions 30' of the at least one magnet 82 are supported by the first and second rotor core pluralities of secondary protrusions 42, 78 in a radially outward spaced relation from the first and second rotor core exterior surfaces 36, 56.

Preferably the step of providing a connection 48 includes applying an adhesive 50 in the radial spacing 46 that holds the at least one larger magnet 82 to the first and second rotor core exterior surfaces 36, 56. Providing the connection 48 further includes placing a clamp (not shown) around the at least one larger magnet 82 and the first and second rotor cores 24, 54 to hold the at least one larger magnet 82 in place on the first and second rotor core primary protrusions 40, 76 and on the first and second rotor core pluralities of secondary protrusions 42, 78 with the primary protrusions 40, 76 and pluralities of secondary protrusions 42, 78 preventing the deformation of the at least one larger magnet 82 by the clamp. The adhesive 50 is then allowed to cure and the clamp is removed after the adhesive 50 has cured.

While the present invention has been described by reference to specific embodiment, it should be understood that modifications and variations of the invention may be constructed without departing from the scope of the invention as defined by the following claims.

What is claimed:

1. A rotor assembly comprising:
   a rotor core having a center axis of rotation and a cylindrical exterior surface with an axial length;
   a support protrusion projecting radially outwardly from the core exterior surface;
   at least one magnet positioned on the support protrusion and being supported in a radially outward spaced relation from the core exterior surface by the support protrusion thereby defining a radial spacing between the core exterior surface and the at least one magnet;

a connection in the radial spacing that holds the magnet to the core exterior surface;

the at least one magnet has an axial length and a transverse width with end portions at opposite ends of the magnet width and a mid portion of the magnet between the end portions;

the support protrusion is a primary support protrusion;

a plurality of secondary support protrusions project radially outwardly from the rotor core exterior surface, the plurality of secondary support protrusions support the end portions of the at least one magnet in a radially outward spaced relation from the exterior surface; and, the primary support protrusion is positioned between two adjacent secondary support protrusions and supports the mid portion of the at least one magnet in a radially outward spaced relation from the core exterior surface.

2. The rotor assembly of claim 1, wherein:

the connection is an adhesive in the radial spacing.

3. The rotor assembly of claim 1 wherein:

the plurality of secondary support protrusions extend axially along the exterior surface.

4. The rotor assembly of claim 1 wherein:

the plurality of secondary support protrusions are equally, circumferentially spaced around the exterior surface.

5. The rotor assembly of claim 1 wherein:

the at least one magnet is one of a plurality of magnets and the primary support protrusion is one of a plurality of primary support protrusions and each of the plurality of primary support protrusions is positioned between adjacent secondary support protrusions and supports the mid portion of one magnet of the plurality of magnets in a radially outward spaced relation from the core exterior surface.

6. A rotor assembly comprising:

a rotor core having a center axis of rotation and a cylindrical exterior surface with an axial length;

a support protrusion projecting radially outwardly from the core exterior surface;

at least one magnet positioned on the support protrusion and being supported in a radially outward spaced relation from the core exterior surface by the support protrusion thereby defining a radial spacing between the core exterior surface and the at least one magnet;

a connection in the radial spacing that holds the magnet to the core exterior surface;

the at least one magnet has an axial length and a transverse width with end portions at opposite ends of the magnet width and a mid portion of the magnet between the end portions;

the support protrusion is a primary support protrusion;

a plurality of secondary support protrusions project radially outwardly from the rotor core exterior surface, the plurality of secondary support protrusions support the end portions of the at least one magnet in a radially outward spaced relation from the exterior surface;

the rotor core is a first rotor core of a pair of first and second rotor cores, the second rotor core has a center axis of rotation and a cylindrical exterior surface with an axial length, the first and second rotor cores each have axially opposite first and second ends, the first ends each have at least one projection extending axially outwardly from the first ends and the second ends each have at least one notch extending axially inwardly from the second ends, the at least one notch is complementary to the at last one projection so that the at least one projection on the first end of the first rotor core can engage in the at least one notch on the second end of the second rotor core to circumferentially and axially align the first and second rotor cores;

the plurality of secondary support protrusions of the first rotor core extend axially along the first rotor core exterior surface;

the second rotor core has a primary support protrusion that projects radially outwardly from the second rotor core exterior surface; and, the second rotor core has a plurality of secondary support protrusions that project radially outwardly from the second rotor core exterior surface in positions where the engagement of the at least one projection on the first end of the first rotor core in the at least one notch on the second end of the second rotor core causes the plurality of secondary support protrusions on the first rotor core to be aligned with the plurality of secondary support protrusions on the second rotor core.

7. The rotor assembly of claim 6, wherein:

the at least one magnet has an axial length and a transverse width with end portions at opposite ends of the magnet width and a mid portion of the magnet between the end portions; and the pluralities of secondary support protrusions of both the first and second rotor cores support the end portions of the at least one magnet in a radially outward spaced relation from the exterior surfaces of the first and second rotor cores.

8. A rotor assembly comprising:

a rotor core having a center axis of rotation and a cylindrical exterior surface with an axial length;

at least one primary support protrusion projecting radially outwardly from the core exterior surface;

a plurality of secondary support protrusions projecting radially outwardly from the core exterior surface, the plurality of secondary support protrusions forming at least one recess between adjacent secondary support protrusions of the plurality of secondary support protrusions;

at least one magnet having an axial length and a transverse width with end portions at opposite ends of the magnet width and a mid portion of the magnet between the end portions, the end portions of the at least one magnet being positioned on a pair of the secondary support protrusions of the plurality of secondary support protrusions and being supported in a radially outward spaced relation from the core exterior surface by the pair of secondary support protrusions and defining a radial spacing between the core exterior surface and the at least one magnet, the at least one primary support protrusion being positioned in the at least one recess so that the at least one primary support protrusion supports the mid portion of the at least one magnet in a radially outward spaced relation from the core exterior surface; and a connection in the radial spacing that holds the at least one magnet to the core exterior surface.

9. The rotor assembly of claim 8, wherein:

the connection is an adhesive in the radial spacing.

10. The rotor assembly of claim 8, wherein:

the plurality of secondary support protrusions extend axially along the core exterior surface.

11. The rotor assembly of claim 8, wherein:

the plurality of secondary support protrusions are equally, circumferentially spaced around the core exterior surface.

12. The rotor assembly of claim 8, wherein:

the at least one primary support protrusion extends axially along the core exterior surface.

13. The rotor assembly of claim 8, wherein:

the at least one primary support protrusion extends axially along the core exterior surface and is centered in the at least one recess between adjacent secondary support protrusions.

14. The rotor assembly of claim 8, wherein:

the rotor core is a first rotor core of a pair of first and second rotor cores, the second rotor core has a center axis of rotation and a cylindrical exterior surface with an axial length; and, the first and second rotor cores each have axially opposite first and second ends, the first ends each having at least one projection extending axially outwardly from each first end and the second ends each having at least one notch extending axially inwardly from each second end, the at least one notch being complementary to the at least one projection so that the at least one projection on the first end of the first rotor core can engage in the at least one notch on the second end of the second rotor core to align the first and second rotor cores.

15. The rotor assembly of claim 14, wherein:

the plurality of secondary support protrusions of the first rotor core extend axially along the first rotor core exterior surface;

the second rotor core has a plurality of secondary support protrusions projecting radially outwardly from the second rotor core exterior surface and extending axially along the second rotor core exterior surface, the plurality of second rotor core secondary support protrusions forming at least one recess between adjacent secondary support protrusions of the second rotor core so that the engagement of the at least one projection on the first end of the first rotor core in the at least one notch on the second end of the second rotor core causes the first and second rotor core pluralities of secondary support protrusions and the at least one recesses formed therebetween to be aligned.

16. The rotor assembly of claim 15, wherein:

the pluralities of secondary support protrusions of both the first and second rotor cores support the end portions of the at least one magnet in a radially outward spaced relation from the exterior surfaces of the first and second rotor cores.

17. A rotor assembly comprising:

a rotor core having a center axis of rotation and a cylindrical exterior surface with an axial length;

a plurality of support protrusions projecting radially outwardly from the rotor core exterior surface, the plurality of support protrusions being spatially arranged on the rotor core exterior surface around the rotor core center axis;

a plurality of magnets, each magnet having an axial length and a transverse width with end portions of the magnet at opposite ends of the magnet width and a mid portion of the magnet between the end portions, the end portions of each magnet being positioned on a pair of support protrusions of the plurality of support protrusions and each magnet being supported in a radially outward spaced relation from the rotor core exterior surface by the pair of support protrusions defining a radial spacing between the rotor core exterior surface and each magnet mid portion;

each support protrusion supporting a pair of magnet end portions of a pair of adjacent magnets on the support protrusion;

a connection in each radial spacing that holds each magnet to the rotor core exterior surface;

the rotor core is a first rotor core of a pair of first and second rotor cores, the first and second rotor cores each have axially opposite first and second ends and the first end of the first rotor core engages with the second end of the second rotor core;

the second rotor core has a center axis of rotation and a cylindrical exterior surface with an axial length;

a plurality of support protrusions project radially outwardly from the second rotor core exterior surface, the plurality of support protrusions of the second rotor core being spatially arranged on the second rotor core exterior surface around the second rotor core center axis and being axially aligned with the plurality of support protrusions of the first rotor core; and the end portions of each magnet being positioned on a pair of support protrusions of the first rotor core and a pair of support protrusions of the second rotor core in a radially outward spaced relation from the first and second rotor core exterior surfaces defining radial spacings between the first and second rotor core exterior surfaces and each magnet mid portion;

each support protrusion of the first rotor core and each support protrusion of the second rotor core supporting a pair of magnet end portions of a pair of adjacent magnets; and a connection in each radial spacing that holds each magnet to the first and second rotor core exterior surfaces.

18. The rotor assembly of claim 17, wherein:

the connection is an adhesive in the radial spacing between each magnet and the first and second rotor core exterior surfaces.

19. The rotor assembly of claim 17, wherein:

the first ends of each of the first and second rotor cores have at least one projection extending axially outwardly from each first end and the second ends of each of the first and second rotor cores have at least one notch extending axially inwardly from each second end, the at least one notch being complementary to the at least one projection and the at least one projection engaging in the at least one notch axially aligning the first and second rotor cores.

20. The rotor assembly of claim 17, wherein:

the plurality of support protrusions on the first and second rotor cores are secondary support protrusions;

a plurality of primary protrusions project radially outwardly from the first and second rotor core exterior surfaces with each primary protrusion being positioned between a pair of adjacent secondary protrusions and engaging with a mid portion of at least one magnet.

21. The rotor assembly of claim 20, wherein:

the primary protrusions extend axially along the first rotor core exterior surface and axially along the second rotor core exterior surface and the primary protrusions of the first rotor core are axially aligned with the primary protrusions of the second rotor core.

22. The rotor assembly of claim 17, wherein:

the first and second rotor cores are the same.

23. A rotor assembly comprising:

a rotor core having a center axis of rotation and a cylindrical exterior surface with an axial length;

a plurality of support protrusions projecting radially outwardly from the rotor core exterior surface, the plurality of support protrusions being spatially arranged on the rotor core exterior surface around the rotor core center axis;

a plurality of magnets, each magnet having an axial length and a transverse width with end portions of the magnet at opposite ends of the magnet width and a mid portion of the magnet between the end portions, the end portions of each magnet being positioned on a pair of support protrusions of the plurality of support protrusions and each magnet being supported in a radially outward spaced relation from the rotor core exterior surface by the pair of support protrusions defining a radial spacing between the rotor core exterior surface and each magnet mid portion;

each support protrusion supporting a pair of magnet end portions of a pair of adjacent magnets on the support protrusion;

a connection in each radial spacing that holds each magnet to the rotor core exterior surface;

the plurality of support protrusions are each a secondary support protrusion; and a plurality of primary support protrusions project radially outwardly from the rotor core exterior surface, each primary support protrusion is positioned between a pair of adjacent secondary support protrusions where the primary support protrusion engages with the mid portion of one of the magnets.

24. The rotor assembly of claim 23, wherein:

the connection is an adhesive in the radial spacing.

25. The rotor assembly of claim 23, wherein:

each primary support protrusion extends axially along the rotor core exterior surface.

* * * * *